United States Patent [19]

Meijs et al.

[11] Patent Number: 5,739,228
[45] Date of Patent: Apr. 14, 1998

[54] POLYMERIZATION USING THIONOESTER COMPOUNDS AS CHAIN TRANSFER AGENTS

[75] Inventors: Gordon Francis Meijs, Murrumbeena; Ezio Rizzardo, Wheelers Hill, both of Australia

[73] Assignee: Commonwealth Scientific and Industrial Research Organization, Parkville, Australia

[21] Appl. No.: 493,937

[22] Filed: Jun. 23, 1995

Related U.S. Application Data

[63] Continuation-in-part of Ser. No. 94,176, Aug. 5, 1993, abandoned.

[30] Foreign Application Priority Data

Feb. 6, 1991 [AU] Australia ................... pk4465/91
Jan. 31, 1992 [WO] WIPO ................... PCT/AU/00029

[51] Int. Cl.⁶ ........................................ C08F 2/02
[52] U.S. Cl. .................. 526/209; 526/211; 526/214; 526/220; 526/222
[58] Field of Search ............... 526/222, 209, 526/204, 211, 214, 220

[56] References Cited

U.S. PATENT DOCUMENTS 2,376,337  5/1945  Browning, Jr.
2,396,997  3/1946  Fryling.
4,054,731  10/1977  Marubashi ................... 526/223

*Primary Examiner*—Christopher Henderson
*Attorney, Agent, or Firm*—Bacon & Thomas

[57] ABSTRACT

A process for the production of low molecular weight polymers by free radical polymerization of one or more monomers in the presence of a chain transfer agent, wherein the chain transfer agent comprises one or more compounds of the general formula I

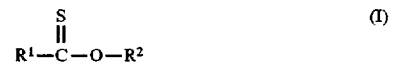

wherein
$R^1$ is a hydrogen atom, an alkyl group, or a group capable of activating the carbon-sulfur double bond towards free radical addition; and $R^2$ represents an optionally substituted alkyl, optionally substituted alkenyl, optionally substituted alkynyl, or optionally substituted saturated, unsaturated or aromatic carbocyclic or heterocyclic ring.

5 Claims, No Drawings

POLYMERIZATION USING THIONOESTER COMPOUNDS AS CHAIN TRANSFER AGENTS

CROSS-REFERENCE TO RELATED APPLICATION

This application is a continuation-in-part of Ser. No. 08/094,176, filed as PCT/AU92/00029, Jan. 31, 1992, now abandoned.

BACKGROUND OF THE INVENTION

1. Field of the Invention

The invention relates to processes for radical-initiated polymerization of unsaturated species and for the regulation of molecular weight and end-group functionality of the polymeric products produced from such processes. Polymers of limited molecular weights, or oligomers, are useful as precursors in the manufacture of other polymeric materials and as additives or components of formulations for plastics, elastomerics, and surface coating compositions, as well as being useful in their own right in many applications. For example, low molecular weight polymers are often required for ease of processing. End-functional polymers are important as building-blocks for advanced copolymers. If of sufficiently low molecular weight, end functional polymers often display useful surface active or compatibilising properties.

2. Description of the Related Art

In conventional polymerization practice, the manufacture of low molecular weight polymers requires the use of an initiator and a chain transfer agent. The initiator acts as a free radical source, whereas the chain transfer agent or regulator controls the molecular weight of the polymer molecule by reacting with the propagating polymer radical to terminate its growth. The chain transfer agent then causes the initiation of a new polymer chain thus transferring the growth process from one discrete polymer molecule to another discrete polymer molecule. At least a part of the chain transfer agent is incorporated into the polymer molecule and is thereby consumed in the process.

The chain transfer agents most commonly used are alkanethiols which possess an objectionable odour, lead to a wide distribution of molecular weights in batch polymerizations with certain monomers, do not allow the production of di-end functional polymers and have limitations as to the types of functional groups that can be installed at the end of the polymer chain. There is also little scope with thiols for the chain transfer constant to be optimised for a particular polymerization. In many polymerizations with thiols, the chain transfer constant, a measure of the effectiveness of the polymerization regulator, departs significantly from the ideal of 1.0 that is the optimum for batch polymerizations at moderate to high conversions. The desirability of chain transfer constants close to 1.0 is reviewed by an article by T. Corner in *Advances in Polymer Science*, volume 62, p. 95 (1985). International Patent Application PCT/AU87/00412 and Australian Provisional Patent Application PJ7146/89 disclose novel polymerization processes employing regulators that help overcome many of the disadvantages of thiols, particularly in relation to chain transfer constant and, in part, provide polymerization processes that give alternative end groups. They also allow incorporation of a wider variety of useful functional groups at the ends of polymer chains.

U.S. Pat. No. 2,396,997 (Fryling) discloses compounds which resemble those of Formula I below, except that the oxygen atom is replaced by sulfur. There is no disclosure or suggestion in Fryling, however, of the oxygen-containing compounds of the present invention. Fryling uses the term "modifier" to describe his compounds. This term was used in the past to cover any compound which, when included in a polymerizing system, would give rise to a change in the solution or melt viscosity of a polymer, as compared with that obtained in its absence. Such compounds might act as chain terminators which would produce lower molecular weight polymers at the cost of lower monomer conversion or of increased amounts of initiators to maintain required conversion rates. Alternatively, these "modifiers" might act as true chain transfer agents, giving low molecular weight polymers without major lowering of conversion rates. There is no indication in Fryling as to which of these two mechanisms is operating.

U.S. Pat. No. 4,607,057 (Bonnans et al) teaches a two-phase polymerization system for producing crosslinked polymer beads, i.e. ion exchange resins. Vinyl thioacetates ($CH_2$=CH—CO—S—R) and styrenic dithioesters are suggested as comonomers to provide reactive groups. Bonnans et al produce crosslinked polymers (of infinite molecular weight) and do not describe or suggest the production of polymers of controlled molecular weight.

SUMMARY OF THE INVENTION

The present invention seeks to overcome the disadvantages of polymerizations regulated with thiols by using alternative polymerization regulators. These regulators have good stability and shelf life while maintaining many of the advantages over thiols. In the majority of cases, the materials that are part of the present process present a different range of chain transfer activities, allowing more opportunity for an optimal process to be selected for a given polymerization system of monomers and polymerization conditions. The chain transfer constant that a given regulator possesses is an important consideration in selecting the optimum process for producing low molecular weight polymers.

The present invention provides a process for the production of low molecular weight polymers by free radical polymerization, which process is characterised by the addition to the polymerization system of a compound of the general formula I

wherein

R$^1$ is a hydrogen atom, an alkyl group, or preferably, a group capable of activating the carbon-sulfur double bond towards free radical addition; and R$^2$ represents an optionally substituted alkyl, optionally substituted alkenyl, optionally substituted alkynyl, or optionally substituted saturated, unsaturated or aromatic carbocyclic or heterocyclic ring.

DESCRIPTION OF THE PREFERRED EMBODIMENTS

Suitable groups for R$^1$ are optionally substituted phenyl or other optionally substituted aromatic groups, alkoxycarbonyl or aryloxycarbonyl (—COOR), carboxy (—COOH), acyloxy (—O$_2$CR), carbamoyl (—CONR$_2$), and cyano (CN), where R is an alkyl or aryl group.

Optional substituents for R$^1$ and/or R$^2$ in formula I may comprise either reactive or non-reactive groups. "Reactive substituent groups" are groups which do not take part in the actual lowering of the molecular weight but are installed at the ends of the polymer chains and may be capable of subsequent chemical reaction. The low molecular weight polymer containing such a reactive group or groups is thereby able to undergo further chemical transformation, such as being joined with another polymer chain. Suitable reactive substituents include hydroxy (—OH), amino (—NH$_2$), halogen, allyl, cyano, epoxy, and carboxylic acid and its derivatives, such as ester groups (—COOAlkyl). "Non-reactive substituent groups" may be any groups which are not deleterious to the polymerization reaction or product, for example, alkoxy (—OAlkyl) or alkyl groups, and which are not capable of subsequent chemical reaction.

Substituted rings may have their reactive substituent groups directly attached to the ring or indirectly attached by means of a methylene group or other side chain.

In this specification, the term "alkyl", used either alone or in compound words such as "optionally substituted alkyl" or "optionally substituted cycloalkyl", denotes straight chain, branched or cyclic alkyl containing from 1 to 32 carbon atoms. Similarly, the terms "alkenyl" and "alkynyl" denote straight chain, branched or cyclic groups containing from 2 to 32 carbon atoms.

Saturated, unsaturated, or aromatic carbocyclic or heterocyclic rings may contain from 3 to 14 atoms. The terms "aromatic" or "aryl", used either alone or in compound words such as "optionally substituted aryl", "optionally substituted aryloxy" or "optionally-substituted heteroaromatic", denote single, polynuclear, conjugated and fused residues of aromatic hydrocarbons or aromatic heterocyclic ring systems.

The term "heterocyclic", used either alone or in compound words such as "optionally substituted saturated or unsaturated heterocyclic", denotes monocyclic or polycyclic heterocyclyl groups containing at least one heteroatom atom selected from nitrogen, sulfur and oxygen.

In this specification "optionally substituted" means that a group may or may not be further substituted with one or more groups selected from alkyl, alkenyl, alkynyl, aryl, halo, haloalkyl, haloalkenyl, haloalkynyl, haloaryl, hydroxy, alkoxy, alkenyloxy, aryloxy, carboxy, benzyloxy haloalkoxy, haloalkenyloxy, haloaryloxy, nitro, nitroalkyl, nitroalkenyl, nitroalkynyl, nitroaryl, nitroheterocyclyl, azido, amino, alkylamino, alkenylamino, alkynylamino, arylamino, benzylamino, acylamino, acyl, alkenylacyl, alkynylacyl, arylacyl, acylamino, acyloxy, aldehydo, alkylsulfonyl, arylsulfonyl, alkylsulfonylamino, arylsulfonylamino, alkylsulfonyloxy, arylsulfonyloxy, heterocyclyl, heterocycloxy, heterocyclylamino, haloheterocyclyl, alkylsulfenyl, arylsulfenyl, carboalkoxy, carboaryloxy, mercapto, alkylthio, arylthio and acylthio.

The process of this invention may be adopted by the users of conventional processes using thiols with little change to reaction conditions other than the substitution of the appropriate quantity of a compound of general formula I for the thiol. The proportion of the compound of general formula I used may be in the range of 0.01 to 30 mole percent based on total monomer, with a preferred range 0.1 to 5 mole percent. The process may be operated at any of the reaction conditions appropriate to free radical polymerization, i.e. temperatures from −100° C. to 400° C. and pressures from below atmospheric to 3000 atmospheres. Bulk, solution, emulsion, suspension or other conventional polymerization modes may be used. Any unsaturated monomers susceptible to free radical polymerization may be used although it should be noted that the chain transfer constant will vary with the monomer used. Suitable unsaturated monomers include acrylic esters, methacrylic esters, acrylonitrile, vinyl halides, vinyl esters, vinyl aromatics, unsaturated or poly unsaturated hydrocarbons, or mixtures of these. For example, the process is applicable to the manufacture of synthetic rubbers, and other polymer formulations where reduced molecular weight aids processing and improves properties. The process can also be used to produce low molecular weight polymers and oligomers for a variety of applications such as high-solids surface coatings, paints, and adhesives.

Compounds of general formula I are readily prepared and, unlike the lower molecular weight thiols, they do not possess an objectionable odour. The compounds used in the process of this invention display an unexpected high activity in controlling molecular weight in polymerization reactions and have chain transfer constants that may be superior to those of thiols, particularly with styrene and acrylates. Their activity is such that their chain transfer constants can approach the optimum of 1.0 for batch polymerizations and this activity is not as highly dependent as that of thiols on the structure of the propagating radical.

A feature of the process of this invention is that, unlike processes described in many of the example of International Patent Application PCT/AU87/00412, it produces polymer chains that do not contain terminal unsaturation. In addition, those chain transfer agents described in International Patent Application PCT/AU87/00412 that specifically do not introduce terminal unsaturation (for example, α-benzyloxystyrene and derivatives) have less satisfactory chain transfer constants and lower shelf life than the compounds of formula I.

An additional, unique feature of the process is that the resulting polymers can be hydrolysed to give a terminal thiol group. Such hydrolysis cleaves off the residue of the chain transfer agent containing $R^1$ and therefore there is no need for $R^1$ to contain a functional substituent for the production of thiol terminated polymers. If $R^2$, however, contains a functional substituent, a di-ed functional polymer will be the product of the process (after the hydrolysis step) and one of the end groups will be a thiol group. Thiol terminated polymers have application as odour-free polymeric chain transfer agents and as building blocks for the preparation of block and graft copolymers.

The end functional polymers produced by any of the aspects of the process described above can be converted into polymers with different and functionality be chemical reaction as is well known in the art. For example, hydroxy terminated polymers can be converted into macromonomers by reaction with methacryloyl chloride. These macromonomers are useful materials for the preparation of graft copolymers by free radical copolymerization.

The materials of formula I that are employed in the process of this invention may be prepared by reaction of the corresponding O-ester with Lawesson's reagent or by treatment of alcohols or alkoxides with thiobenzoyl chloride or the sodium salt of (thiobenzylthio)acetic acid. The reaction of iminoesters with hydrogen sulfide has also been reported to give thionoesters.

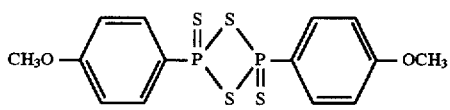

Lawesson's Reagent

The following illustrates some of the methods used to prepare examples of the compounds used in the process.

Benzyl Thionobenzoate:

Hy method A [Lawesson's reagent]. Benzyl benzoate (2.1 g) was heated at 140° C. for 24 h with Lawesson's Reagent (4.9 g) in anhydrous xylene (10 ml). After removal of the solvent and subjection of the mixture to chromatography on silica gel and recrystallization from pentane at low temperature, benzyl thionobenzoate was obtained in 67% yield. $^1$H NMR (CDCl$_3$): δ=5.64 (s, 2H), 7.3–8.2 (m, 10H).

By method B [Thionobenzoyl chloride route]. Thionyl chloride (71 g) was added dropwise to a solution of dithiobenzoic acid (47 g) in anhydrous ether (44 ml). After 7 h of stirring at ambient temperature, the ether and excess thionyl chloride were removed under reduced pressure. The residue was then distilled twice to afford the thioacid chloride (61%): b.p. 54°–64° C. [0.01 mmHg]. Triethylamine (2.03 g) was added in one portion to a solution of the thioacid chloride (3.13 g) and benzyl alcohol (2.16 g) in dry acetone (40 ml) under nitrogen with vigorous stirring. The stirring was continued for 15 h at ambient temperature. The mixture was then poured into water and extracted with ether. The extracts were washed and dried (MgSO4) and the residue was subjected to chromatography on silica gel (eluent: hexane) to give a viscous yellow oil (3.0 g) which was crystallised from pentane to afford benzyl thionobenzoate (2.4 g, 53%): m.p. 39°–40° C.

By method C [(Thiobenzylthio)acetic acid route]. Phenylmagnesium bromide was prepared by adding bromobenzene (20 g) in ether (100 ml) dropwise under nitrogen and reflux to a stirred mixture of magnesium turnings (3.2 g) in anhydrous ether (50 ml). After 30 minutes boiling under reflux, the mixture was cooled in ice and carbon disulfide (12 ml) was added dropwise. The mixture was allowed to warm gradually to 20° C. and stirred for a further 15 h. After this period, ice (130 g) was cautiously added, and the organic layer was separated. The sodium salt of chloroacetic acid (12 g) was added to the aqueous phase and the mixture was allowed to stand for 24 h. After this period, it was brought to pH 1 with hydrochloric acid and extracted with ether. The ether extracts were washed with water (×3), dried (CaCl$_2$), and the solvent was removed to afford a residue that was recrystallised from benzene to give the acid derivative (7.9 g): m.p. 125°–126° C.). A portion (1.06 g) was dissolved in dry tetrahydrofuran (125 ml) and sodium hydride (0.48 g) was then added. After the effervescence had ceased, imidazole (0.68 g) was added and the mixture was refluxed for 5 minutes. Benzyl alcohol was then added and the mixture was refluxed for a further 5 min. It was then cooled, poured into water, and extracted with ether. The extracts were washed three times with water, dried and the solvent was removed to give benzyl thionobenzoate (0.72 g), which was further purified by flash chromatography on silica gel (eluent b.p. 10°–60° C. petroleum spirit) and recrystallization from pentane. Yield: 4 g. m.p. 38°–39° C.

(4-Methoxycarbonylbenzyl) thionobenzoate: Method C was used to prepare this compound in low yield (ca. 5% overall) from bromobenzene and methyl (4-hydroxymethyl) benzoate. The thionoester was recrystallised from dichloromethane/hexane: m.p. 90°–91° C. $^1$H NMR (CDCl$_3$): δ=3.92 (s, 3H), 5.74 (s, (2H), 7.2–7.7 (m, 5H), 7.9–8.3 (m, 4H). MS (CH$^4$): m/z 287 (MH$^+$, 25%), 149 (32%).

Benzyl 4-methoxythionobenzoate: This compound was prepared from 4-bromoanisole and benzyl alcohol in 5% overall yield by Method C. It was recrystallised from dichloromethane/hexane: m.p. 68°–69° C. $^1$H NMR (CDCl$_3$): δ=3.67 (s, 3H), 5.60 (s, 2H), 6.73 (d, J=9 Hz, 2H), 7.1–7.6 (m, 5H), 8.13 (d, J=9 Hz, 2H). MS (CH$^4$): m/z 259 (MH$^+$, 10%), 135 (100%), 107 (10%), 91 (45%).

(4-Methoxycarbonylbenzyl) 4-methoxythionobenzoate: Method C was used to prepare this compound in 11% overall yield from 4-bromoanisole and methyl (4-hydroxymethyl) benzoate. The crude product was subjected to flash chromatography (eluent: dichloromethane) and recrystallised from dichloromethane/hexane: m.p. 83°–85° C. $^1$H NMR (CDCl$_3$): δ=3.83 (s, 3H), 3.93 (s, 3H), 5.75 (s, 2H), 6.83 (d, J=7.5 Hz, 2H), 7.50 (d, J=7.5 Hz, 2), 7.9–8.3 (m, 4H). MS (CH$^4$): m/z 317 (MH$^+$, 3%), 149 (18%), 135 (100%). Accurate mass m/z 317.0836. C$_{17}$H$_{17}$O$_4$S requires m/z 317.0847.

(4-Ethoxycarbonylbenzyl) 4-methoxythionobenzoate: This compound was prepared from 4-bromoanisole and ethyl (4-hydroxymethyl)benzoate by Method C. The overall yield was 18% and recrystallization from dichloromethane/hexane was used for purification. m.p. 75°–77° C. $^1$H NMR (CDCl$_3$) δ–1.40 (t, J=7 Hz, 3H), 3.83 (S, 3H), 4.37 (q, J=7 Hz, 2H), 5.73 (s, 2H), 6.80 (d, J=7.5 Hz, 2H), 7.50 (d, J=7.5 Hz, 2H), 8.0–8.4 (m, 4H). MS (CH$^4$): m/z 331 (MH$^+$, 40%), 163 (40%), 135 (100%).

4-(hydroxymethyl)benzyl thionobenzoate: This compound was prepared using Method B in 26% yield from thiobenzoyl chloride and 1,4-benzenedimethanol. After recrystallization from hexane, yellow needles of the thionoester were obtained. m.p. 80°–80.5° C. $^1$H NMR (CDCl$_3$): δ=1.67 (s, 1H), 4.68 (s, 2H), 5.68 (s, 2H), 7.40 (m, 7H), 8.17 (d, J=6 Hz, 2H). MS (EI): m/z 257 (M$^+$–1, 12%), 241 (90%), 121 (100%). Accurate mass m/z 258.0732. C$_{15}$H$_{14}$O$_2$S requires m/z 258.0714.

The following non-limiting examples illustrate the invention.

EXAMPLE 1

Preparation of Low Molecular Weight Polystyrene with Benzyl Thionobenzoate

Azobisisobutyronitrile (35 mg) was dissolved in freshly distilled styrene (25 ml). Aliquots (5.0 ml) were removed and added to ampoules containing the amount of benzyl thionobenzoate shown below in Table 1. The mixture were polymerized at 60° C. for 1 h in the absence of oxygen. The contents of the ampoule wee then poured into methanol and the precipitated polymer was collected and dried in vacuo overnight. A small portion was examined by gel permeation chromatography (GPC) using a Waters Instrument connected to six μ-Styragel columns (10$^4$, 10$^5$, 10$^4$, 10$^3$, 500, and 100 Å pore size). Tetrahydrofuran was used as eluent at a flow rate of 1 ml/min and the system was calibrated using narrow distribution polystyrene standards (Waters). The results appear in Table 1.

TABLE 1

| Amount of benzyl thionobenzoate added | Conversion % | $\bar{M}_n$ |
| --- | --- | --- |
| 81 mg | 2.7 | 11400 |
| 41 mg | 2.9 | 20800 |
| 21 mg | 3.0 | 37600 |
| 0 mg | 3.2 | 124000 |

The chain transfer constant ($C_x$), calculated from these data, was 1.0 which compares favourably with that from u-butanethiol ($C_x$=21-25). These results show that the compound is an efficient chain transfer agent and that the process produces polymers of low molecular weight in a controlled manner.

EXAMPLE 2

Preparation of Low Molecular Weight Poly(methyl acrylate) with Benzyl Thionobenzoate Azobisisobutyronitrile (9 mg) was dissolved in freshly distilled methyl acrylate (25 ml). Aliquots (2.0 ml) were removed and added to ampoules containing thiophen-free benzene (8 ml) and the amount of benzyl thionobenzoate shown below in Table 2. The mixtures were polymerized at 60° C. for 1 h in the absence of oxygen. The volatiles were then removed and the polymers were dried in vacuo to constant weight and then examined as before. The results appear in Table 2.

TABLE 2

| Amount of benzyl thionobenzoate added | Conversion % | $\bar{M}_n$ * |
| --- | --- | --- |
| 50 mg | 3.8 | 9020 |
| 26 mg | 6.0 | 17700 |
| 12 mg | 9.2 | 35600 |
| 0 mg | 16 | 473000 |

* Polystyrene-equivalent number average molecular weight, obtained by GPC.

The chain transfer constant ($C_x$), calculated from these data, was 1.2, which compares favourably with that from n-butanethiol ($C_x$=1.7).

EXAMPLE 3

Preparation of Low Molecular Weight Poly(vinyl acetate) with Benzyl Thionobenzoate Azobisisobutyronitrile (16 mg) was dissolved in freshly distilled vinyl acetate (100 ml). Aliquots (10.0 ml) were removed and added to ampoules containing the amount of benzyl thionobenzoate shown below in Table 3. The mixtures were polymerized at 60° C. for 1 h in the absence of oxygen. The volatiles were then removed and the polymers were dried in vacuo to constant weight and then examined as before. The results appear in Table 3.

TABLE 3

| Amount of benzyl thionobenzoate added | $\bar{M}_n$ * |
| --- | --- |
| 2.2 mg | 1900 |
| 0 | 253000 |

* Polystyrene-equivalent number average molecular weight, obtained by GPC.

The chain transfer constant ($C_x$), calculated from these data, was >20. These results show that the compound acts as a very active regulator in polymerization of vinyl acetate.

EXAMPLE 4

Preparation of Low Molecular Weight Polystyrene with (4-Methoxycarbonylbenzyl) Thionobenzoate Samples of polystyrene were prepared on the same scale and in the manner of example 1. The amount of (4-methoxycarbonylbenzyl) thionobenzoate added and the results of the polymerization are shown in Table 4.

TABLE 4

| Amount of (4-methoxycarbonylbenzyl) thionobenzoate added | $\bar{M}_n$ |
| --- | --- |
| 80 mg | 23000 |
| 40 mg | 41900 |
| 20 mg | 66300 |
| 0 mg | 142000 |

The chain transfer constant ($C_x$), calculated from these data, was 0.59. A sample of low molecular weight polystyrene ($\bar{M}_a$=4570) prepared with (4-methoxycarbonylbenzyl) thionobenzoate was examined by $^1$H NMR spectroscopy and showed signals at δ=3.83 indicative of the presence of methyl ester groups. Integration of the spectrum and comparison with the integral of the aromatic styrene signal showed there to be an end group functionality of 0.9–1.0. This experiment shows that the process can be used to prepare end functional polymers.

EXAMPLE 5

Preparation of Low Molecular Weight Poly(methyl acrylate) with (4-Methoxycarbonylbenzyl) Thionobenzoate Samples of poly(methyl acrylate) were prepared according to the directions given in Example 2, except that (4-methoxycarbonylbenzyl) thionobenzoate was used rather than benzyl thionobenzoate. The amount of (4-methoxycarbonylbenzyl) thionobenzoate added and the results of the polymerization are shown in Table 5.

TABLE 5

| Amount of (4-methoxycarbonylbenzyl) thionobenzoate added | $\bar{M}_n$ * |
| --- | --- |
| 50 mg | 7700 |
| 26 mg | 14300 |
| 12 mg | 28300 |
| 0 mg | 772000 |

* Polystyrene-equivalent number average molecular weight, obtained by GPC

The chain transfer constant ($C_x$), calculated from these data, was 1.4, which compares favourably with that from n-butanethiol ($C_x$=1.7).

EXAMPLE 6

Preparation of Low Molecular Weight Polystyrene with Benzyl 4-Methoxy(thionobenzoate)

Samples of polystyrene were prepared on the same scale and in the manner of example 1. The amount of benzyl 4-methoxy(thionobenzoate) added and the results of the polymerization are shown in Table 6.

TABLE 6

| Amount of benzyl 4-methoxy(thionobenzoate) added | $\bar{M}_n$ |
|---|---|
| 80 mg | 65100 |
| 40 mg | 93500 |
| 20 mg | 113000 |
| 0 mg | 145000 |

The chain transfer constant ($C_x$), calculated from these data, was 0.12.

EXAMPLE 7

Preparation of Low Molecular Weight Poly(methyl acrylate) with Benzyl 4-Methoxy(thionobenzoate)

Samples of poly(methyl acrylate) were prepared according to the directions given in Example 2, except that benzyl 4-methoxy(thionobenzoate) was used rather than benzyl thionobenzoate. The amount of benzyl 4-methoxy (thionobenzoate) added and the results of the polymerization are shown in Table 7.

TABLE 7

| Amount of benzyl 4-methoxy(thionobenzoate) added | $\bar{M}_n$ * |
|---|---|
| 50 mg | 10700 |
| 26 mg | 18600 |
| 13 mg | 42600 |
| 0 mg | 394000 |

* Polystyrene-equivalent number average molecular weight, obtained by GPC

The chain transfer constant ($C_x$), calculated from these data, was 1.1, which compares favourably with that from n-butanethiol ($C_x$=1.7).

EXAMPLE 8

Preparation of Low Molecular Weight Polystyrene with 4-(Methoxycarbonyl)benzyl 4-Methoxy (thionobenzoate)

Samples of polystyrene were prepared on the same scale and in the manner of example 1. The amount of 4-(methoxycarbonyl)benzyl 4-methoxy(thionobenzoate) added and the results of the polymerization are shown in Table 8.

TABLE 8

| Amount of 4-(methoxycarbonyl)benzyl 4-methoxy(thionobenzoate) added | $\bar{M}_n$ |
|---|---|
| 81 mg | 48400 |
| 40 mg | 86000 |

TABLE 8-continued

| Amount of 4-(methoxycarbonyl)benzyl 4-methoxy(thionobenzoate) added | $\bar{M}_n$ |
|---|---|
| 20 mg | 105300 |
| 0 mg | 150000 |

The chain transfer constant ($C_x$), calculated from these data, was 0.25. The total average functionality (methoxy and methoxycarbonyl groups) calculated by $^1$H NMR on a sample of polystyrene of $\bar{M}n$=13300 (prepared with 4-(methoxycarbonyl)benzyl 4-methoxy(thionobenzoate) was 2.1, which shows that 4(methoxycarbonyl)benzyl 4-methoxy(thionobenzoate) is efficient in introducing functional groups at the termini of polymer chains and that this type of chain transfer agent can be used to prepare end-functional polymers.

EXAMPLE 9

Preparation of Low Molecular Weight poly(methyl acrylate) with 4-(Methoxycarbonyl)benzyl 4-Methoxy(thionobenzoate)

Samples of poly(methyl acrylate) were prepared according to the direction given in Example 2, except that 4-(methoxycarbonyl)benzyl 4-methoxy(thionobenzoate) was used rather than benzyl thionobenzoate. The amount of 4-(methoxycarbonyl)benzyl 4-methoxy(thionobenzoate) added and the results of the polymerization are shown in Table 9.

TABLE 9

| Amount of 4-(methoxycarbonyl)benzyl 4-methoxy(thionobenzoate) added | $\bar{M}_n$ * |
|---|---|
| 50 mg | 10700 |
| 26 mg | 18600 |
| 13 mg | 42600 |
| 0 mg | 394000 |

* Polystyrene-equivalent number average molecular weight, obtained by GPC

The chain transfer constant ($C_x$), calculated from these data, was 1.1, which compares favourably with that from n-butanethiol ($C_x$=1.7).

EXAMPLE 10

Preparation of Low Molecular Weight Polystyrene with 4-(Ethoxycarbonyl)benzyl 4-Methoxy (thionobenzoate)

Samples of polystyrene were prepared on the same scale and in the manner of Example 1. The amount of 4-(ethoxycarbonyl)benzyl 4-methoxy(thionobenzoate) added and the results of the polymerization are shown in Table 10.

TABLE 10

| Amount of 4-(ethoxycarbonyl)benzyl 4-methoxy(thionobenzoate) added | $\bar{M}_n$ |
|---|---|
| 616 mg | 13500 |
| 0 mg | 150000 |

The presence of ethoxycarbonyl and methoxy end groups in the lower molecular weight sample of polystyrene was

EXAMPLE 11

Preparation of Low Molecular Weight Polystyrene with 4-(hydroxymethyl)benzyl thionobenzoate Samples of polystyrene were prepared on the same scale and in the manner of example 1. The amount of 4 (hydroxymethyl)benzyl thionobenzoate added and the results of the polymerization are shown in Table 11.

TABLE 11

| Amount of 4(hydroxymethyl)benzyl thionobenzoate added | $\bar{M}_n$ |
|---|---|
| 81 mg | 25600 |
| 40 mg | 43900 |
| 20 mg | 59500 |
| 0 mg | 113000 |

The chain transfer constant was 0.43. The presence of the end group shown below in a polymer of $\bar{M}u=6810$, prepared with 4-(hydroxymethyl)benzyl thionobenzoate, was confirmed by a broad signal in the $^1H$ NMR spectrum at δ—4.4–4.7 (due to the benzyl methylene hydrogens) and an infrared absorption at 3415 cm$^{-1}$.

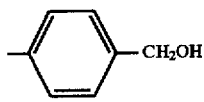

Each group of polymer prepared with
4-(hydroxlmethyl)benzyl thionobenzoate

After treatment with t-butyldimethylsilyl chloride and imidazole, this polymer showed signals at δ=0.08 in the $^1H$ NMR spectrum due to the methyls of a t-butyldimethylsilyl ether group. The formation of this silyl ether further confirms the presence of a hydroxyl end group.

We claim:

1. A process for the production of low molecular weight polymers by free radical polymerization of one or more monomers selected from the group consisting of acrylic esters, methacrylic esters, vinyl esters, vinyl aromatics, unsaturated and polyunsaturated hydrocarbons and mixtures of any two or more of such monomers, in the presence of a chain transfer agent, wherein the chain transfer agent comprises one or more compounds having the formula:

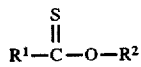

wherein $R^1$ is selected from the group consisting of hydrogen, straight chain, branched and cyclic alkyl containing from 1 to 32 carbon atoms, optionally substituted aromatic groups containing from 5 to 14 ring atoms, alkoxycarbonyl, aryloxycarbonyl, carboxy, acyloxy, carbamoyl, and cyano; and $R^2$ is selected from the group consisting of optionally substituted alkyl, optionally substituted alkenyl, optionally substituted alkynyl, optionally substituted unsaturated or aromatic carbocyclic rings containing from 3 to 14 ring atoms, optionally substituted saturated or unsaturated mono or polycyclic heterocyclyl groups containing 3 to 14 atoms including at least one heteroatom selected from nitrogen, sulfur and oxygen, and optionally substituted aralkyl groups including an aromatic ring containing from 5 to 14 ring atoms.

2. A process for the production of low molecular weight polymers by free radical polymerization of one or more monomers selected from the group consisting of acrylic esters, methacrylic esters, vinyl esters and vinyl aromatics and mixtures of any two or more of such monomers, in the presence of a chain transfer agent, wherein the chain transfer agent comprises one or more compounds having the formula:

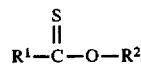

wherein $R^1$ is an optionally substituted aromatic group containing from 5 to 14 ring atoms; and $R^2$ is selected from optionally substituted aromatic groups containing from 5 to 14 ring atoms, and optionally substituted aralkyl groups including an aromatic ring containing from 5 to 14 ring atoms.

3. A process for the production of low molecular weight polymers by free radical polymerization of one or more monomers selected from acrylic esters and vinyl aromatics, in the presence of a chain transfer agent, wherein the chain transfer agent comprises one or more compounds having the general formula:

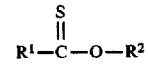

wherein $R^1$ is optionally substituted phenyl and $R^2$ is optionally substituted benzyl.

4. A process for the production of low molecular weight polymers by free radical polymerization of one or more monomers selected from acrylic esters, methacrylic esters, vinyl esters and vinyl aromatic and mixtures of any two or more of such monomers in the presence of a chain transfer agent selected from the group consisting of benzylthionobenzoate, 4-methoxycarbonylbenzylthiobenzoate, 4-methoxycarbonylbenzyl 4-methoxythionobenzoate, 4-ethoxycarbonylbenzyl 4-methoxythionobenzoate and 4-hydroxymethylbenzyl thionobenzoate.

5. The method of claim 1 wherein the chain transfer agent is benzyl 4-methoxy (thionobenzoate) and the monomer is methyl acrylate.

* * * * *